United States Patent
Lin et al.

(10) Patent No.: US 8,977,107 B2
(45) Date of Patent: Mar. 10, 2015

(54) STORAGE DEVICE AND METHOD FOR RESUMING PLAYBACK OF CONTENT

(75) Inventors: Jason T. Lin, Los Gatos, CA (US);
Daniel Schreiber, Jerusalem (IL);
Henry R. Hutton, Tracy, CA (US);
Joseph E. Halpern, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 876 days.

(21) Appl. No.: 12/651,223

(22) Filed: Dec. 31, 2009

(65) Prior Publication Data
US 2011/0158606 A1 Jun. 30, 2011

(51) Int. Cl.
*H04N 5/92* (2006.01)
*G11B 27/10* (2006.01)
*G11B 27/11* (2006.01)
*G11B 27/32* (2006.01)

(52) U.S. Cl.
CPC .............. *G11B 27/105* (2013.01); *G11B 27/11* (2013.01); *G11B 27/322* (2013.01); *G11B 2220/61* (2013.01)
USPC .......................................... 386/248; 386/239

(58) Field of Classification Search
CPC ............. H04N 5/85; H04N 5/91; H04N 9/80; H04N 9/8042; G11B 27/329; G11B 27/034; G11B 27/105; G11B 27/11; G11B 27/322; G11B 2220/61
See application file for complete search history.

(56) References Cited

U.S. PATENT DOCUMENTS

| | | | |
|---|---|---|---|
| 5,263,158 A | 11/1993 | Janis | |
| 7,010,681 B1 | 3/2006 | Fletcher et al. | |
| 2003/0028899 A1* | 2/2003 | MacInnis | 725/132 |
| 2004/0153171 A1 | 8/2004 | Brandt et al. | |
| 2005/0157600 A1 | 7/2005 | Teicher | |
| 2005/0289508 A1 | 12/2005 | Illowsky et al. | |
| 2007/0143824 A1 | 6/2007 | Shahbazi | |
| 2007/0233819 A1 | 10/2007 | Sato | |
| 2008/0133938 A1 | 6/2008 | Kocher et al. | |
| 2009/0274453 A1* | 11/2009 | Viswambharan et al. | 386/126 |
| 2013/0165222 A1* | 6/2013 | Wysocki | 463/29 |

FOREIGN PATENT DOCUMENTS

| | | |
|---|---|---|
| CN | 101140575 | 3/2008 |
| CN | 101438348 | 5/2009 |

(Continued)

OTHER PUBLICATIONS

International Search Report and Written Opinion for PCT/US2010/056527, dated Mar. 4, 2011, 7 pages.

(Continued)

*Primary Examiner* — William C Vaughn, Jr.
*Assistant Examiner* — Eileen Adams
(74) *Attorney, Agent, or Firm* — Brinks Gilson & Lione

(57) ABSTRACT

A storage device and method for resuming playback of content are provided. In one embodiment, a storage device comprises a memory operative to store a plurality of versions of content. The storage device receives a request for one of the versions of the content from a host, provides the requested version of the content to the host, and provides bookmark information from which the host can determine a location where to resume playback of the content, wherein the bookmark information indicates where playback ended for a different version of the content.

26 Claims, 6 Drawing Sheets

(56) References Cited

FOREIGN PATENT DOCUMENTS

| | | |
|---|---|---|
| EP | 1 615 445 | 1/2006 |
| WO | WO 2007/130052 | 11/2007 |
| WO | WO 2008/008244 A3 | 1/2008 |

OTHER PUBLICATIONS

Office Action issued in European Patent Application No. 10784616.4, mailed Jan. 7, 2014, 4 pages.

English translation of Office Action for Chinese Patent Application Serial No. 2010800581673 dated Apr. 2, 2014, 5 pages.

\* cited by examiner

STORAGE DEVICE AND METHOD FOR RESUMING PLAYBACK OF CONTENT

BACKGROUND

A bookmark, in the oldest sense of the word, is a thin marker used to keep one's place in a book so that the user can resume reading it easily from where he left off. Bookmark/resume functions have been implemented in a wide variety of modern electronic devices in an attempt to provide similar functionally with digital content. For example, DVD and Blu-ray Disc players use bookmarks to allow a user to resume playback of a disc when the power to the player is restarted. However, these bookmarks are stored on the player, as bookmarks cannot be written back to optical discs that are read only. Accordingly, unlike a bookmark that travels with a physical book, the bookmarks for DVDs and Blu-ray discs stay with the player and do not travel with the discs. This means that a disc, inserted into a new player, will not retain information about where to resume playback. Accordingly, to resume playback from a previous location, a user would need to manually search for the location by, for example, manually selecting a scene and/or by fast-forwarding to a recorded time code in the scene.

Bookmark functionality has also been implemented in digital audio players, such as the SanDisk Sansa® line of players and the Apple iPod, where a simple time code is used to mark a position in the playback of a song. Only a few digital audio players support removable storage devices ("physical media"), and many of those maintain their bookmarks on the player rather than on the media. One exception is the slotRadio™ card, which maintains bookmarks on the media, with each bookmark being attached to a single instance of a music file.

Bookmarks also are important elements of the online experience. All major web browsers support the storing and management of bookmarks as Uniform Resource Identifiers (URIs). For some browsers, the bookmarks may be called Favorites or Internet Shortcuts. These bookmarks are sometimes precise and are typically independent of a particular instance of a web browser program. Exporting and importing bookmarks between two different computer systems or even between different browsers on the same device is often far from straightforward. Also, shared bookmarks are used in the "Internet cloud," such as in social networking and streaming video sites.

SUMMARY

The present invention is defined by the claims, and nothing in this section should be taken as a limitation on those claims.

By way of introduction, the embodiments described below provide a storage device and method for resuming playback of content. In one embodiment, a storage device comprises a memory operative to store a plurality of versions of content. The storage device receives a request for one of the versions of the content from a host, provides the requested version of the content to the host, and provides bookmark information from which the host can determine a location where to resume playback of the content, wherein the bookmark information indicates where playback ended for a different version of the content.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Figure 1:
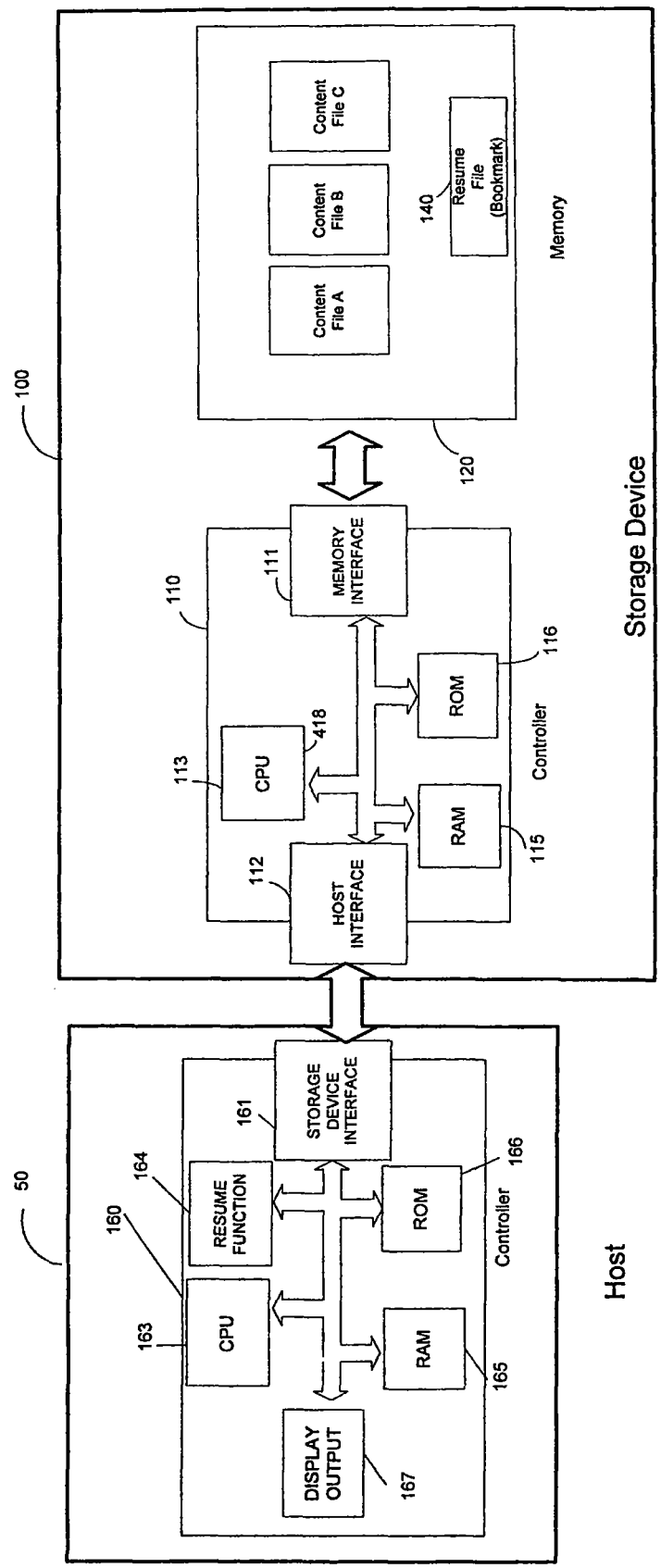
FIG. 1 is a block diagram of a host and a storage device of an embodiment.

Turning now to the drawings, FIG. 1 is a block diagram of a host 50 and a storage device 100 of an embodiment. As shown in FIG. 1, the storage device 100 comprises a controller 110 and a memory 120 operative to store a plurality of versions of content. "Content" can take any suitable form, such as but not limited to (2D or 3D) digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game, and a hybrid multi-media presentation of two or more of these forms. The memory 120 also stores a bookmark in a resume file 140, which will be discussed in more detail below.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in FIG. 1. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. Further, the storage device 100 can contain other components, which are not shown in FIG. 1 to simplify the drawings. In one embodiment, the storage device 100 takes the form of a handheld, removable memory card; however, the storage device 100 can take other forms, such as, but not limited to, a solid-state drive and a universal serial bus (USB) device.

As shown in FIG. 1, the storage device 100 is in communication with the host 50. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer, a game device, a personal digital assistant (PDA), and a TV system. Preferably, the storage device 100 is removably connected to the host 50, so a user can use the storage device 100 with a variety of hosts.

The storage device 100 of these embodiments can be implemented in any suitable manner, and the implementation shown in FIG. 1 is merely one example. In the implementation shown in FIG. 1, the controller 110 comprises a memory interface 111 for interfacing with the memory 120 and a host interface 112 for interfacing with the host 50. The controller 110 also comprises a central processing unit (CPU) 113, read access memory (RAM) 115, and read only memory (ROM) 116 which can store firmware for the basic operations of the storage device 100. Also, while the memory 120 is shown as a single box in FIG. 1, it should be understood that the memory can comprise a public partition that is managed by a file system on the host 50 and a hidden protected system area that is internally managed by the controller 110.

Turning now to the host 50, the host 50 comprises a controller 160 that has a storage device interface 161 for interfacing with the storage device 100. The controller 160 also comprises a central processing unit (CPU) 163, a resume (bookmark) function module 164, read access memory (RAM) 165, read only memory (ROM) 166, and a display output 167. The storage device 100 and the host 50 communicate with each other via a storage device interface 161 and a host interface 112.

As discussed above, only a few digital media players support removable storage devices, and many of those maintain their bookmarks on the player rather than on the storage devices. Accordingly, in that ecosystem, the bookmarks are not portable with the storage devices. An exception to this is the slotRadio™ card, which maintains bookmarks on the storage device. Players that use such cards take advantage of the ability of physical media to remember information and to allow bookmarks to travel with the cards. The slotRadio™ microSD card incorporates a bookmarking mechanism to keep track of the last channel, playlist, song, and timecode within a song that was playing on the card when music was paused, a channel was changed, or the player was powered off.

Storage devices, such as a microSD card, can be used with many different types of players with dramatically different form factors, screen sizes, and processing power (e.g., mobile phones, portable computers, and home theater systems). As such, the storage device can store a plurality of different versions of a given piece of content (e.g., a movie), with each version (or content type) varying in quality (e.g., high definition (HD), standard definition (SD), and quarter video graphics array (QVGA)). This allows the same physical media to transport compatible content across multiple platforms. However, if a bookmark is attached to a single instance of a file, the bookmark will not port over to another instance of a file stored in the storage device. Consider, for example, a situation in which a user starts playback of a QVGA version of a movie on a handheld device, stops play, and then later wants to resume playback of the movie on a HD player. If the bookmark were attached only to the QVGA version of the movie, the HD version of the movie would start playing from the beginning and not from where the user left off in the QVGA version because the bookmark was not attached to the HD version.

The embodiments presented herein provide mechanisms for standardizing and automatically coordinating electronic bookmarks on a physical media across multiple versions (e.g., resolutions) of the content. This adds the capability to seamlessly transition from one playback device to another while retaining the resume position in the media across different files, resolutions, and/or navigational structures. This allows a user to, for example, start playback of one content file and later resume playback at a similar location in a different content file in a fashion that is coordinated among all instances of the digital content.

In general, these embodiments allows a removable storage device that stores content in multiple versions (e.g., resolutions, game features, etc.) to provide resume playback functionality across multiple hosts. For example, these embodiments allow the saving of a single bookmark on a removable storage device by host player A (i.e., a host that is compatible with resolution "A" (e.g., QVGA)) that can be used to resume playback on when the storage device is used by host player B (i.e., a host that is compatible with resolution "B" (e.g., HD)) even if the host player B uses a different resolution of the content than host player A. Resolution between two instances of content can differ by bit rate (e.g., 5 Mbps vs 10 Mbps), frame rate (e.g., 24 frames per second (fps) vs 30 fps), frame size (e.g., QVGA (320×240) vs DVD standard definition (720×480)), encoding format (e.g., H.264 AVC vs MPEG-2) and/or some other attribute that would require a new similar copy of the content to exist.

Figure 2:
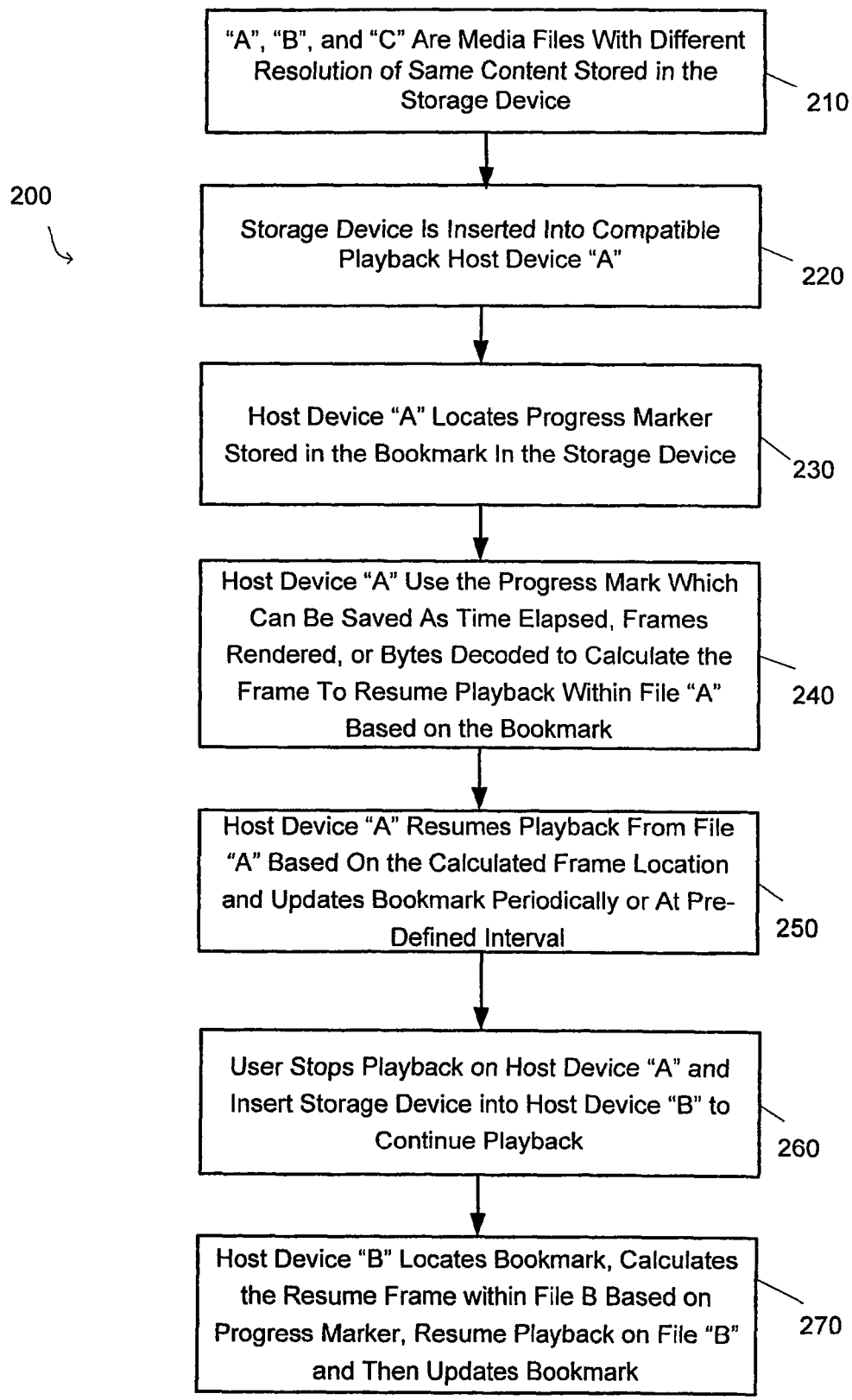
FIG. 2 is a flow chart of a method for resuming playback of content of an embodiment.

FIG. 2 is a flow chart 200 of a method that illustrates this embodiment. As shown in FIG. 2 and with reference to FIG. 1, content files A, B, and C, which are media files with different resolutions of the same content, are stored in the storage device 100 (act 210). The storage device 100 is then inserted into a playback host device (host device A) that is compatible with resolution A (act 220). Host device A then locates a progress marker stored in the bookmark in the resume file 140 in the storage device 100 (act 230). The progress marker can specify information, such as, but not limited to, time elapsed, frames rendered, or bytes decoded, and host device A can use this information to calculate the frame needed to resume playback within file A based on the bookmark (act 240). Next, host device A resumes playback from file "A" based on the calculated frame location and updates bookmark periodically or at a pre-defined interval (act 250). Such periodic or configurable saving of the bookmark could be done to the media during playback or defaulted during host device manufacturing time so that the media can be removed and inserted into another device. Preferably, the progress marker is stored in a known or discoverable bookmark location on the removable media. If the storage device 100 is removed and reinserted into host device A, the bookmark file can be read and applied to the same resolution of content in order to resume playback. However, if a user stops playback on host device A and insert the storage device 100 into host device B to continue playback (act 260), host device B locates the bookmark, calculates the resume frame within file B based on progress marker, resume playback on file B, and then updates bookmark (act 270). That is, host device B can read the bookmark file and compute a comparable resume location to enable playback from perceptually the same or nearly the same location as the spot marked in the original source resolution. Host device B can then update the bookmark on the media with the data from the new resolution and continues to update it periodically during playback, as above.

Figure 3:
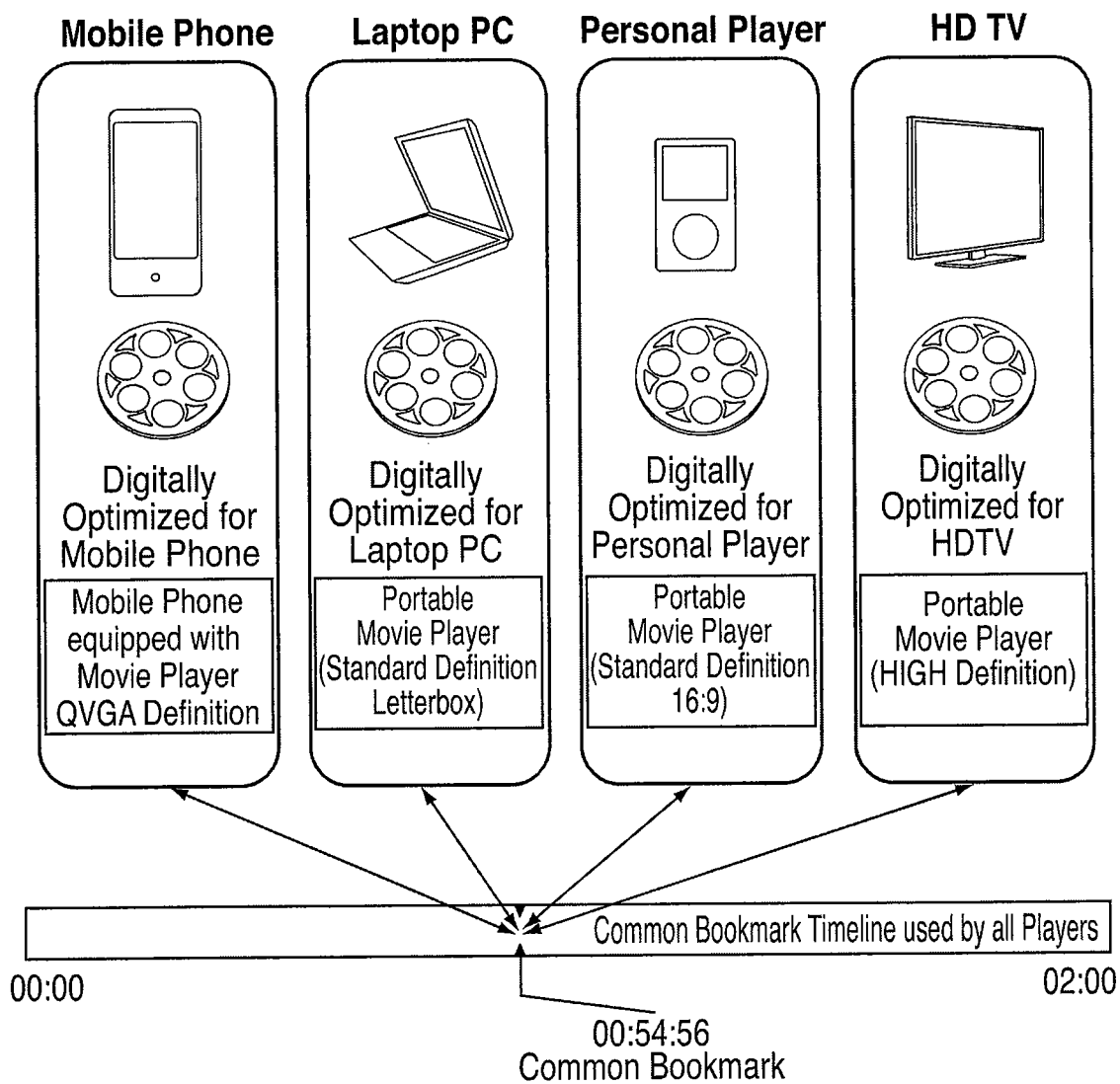
FIG. 3 is an illustration of how a resume function of an embodiment can be used across host platforms.
Figure 4:
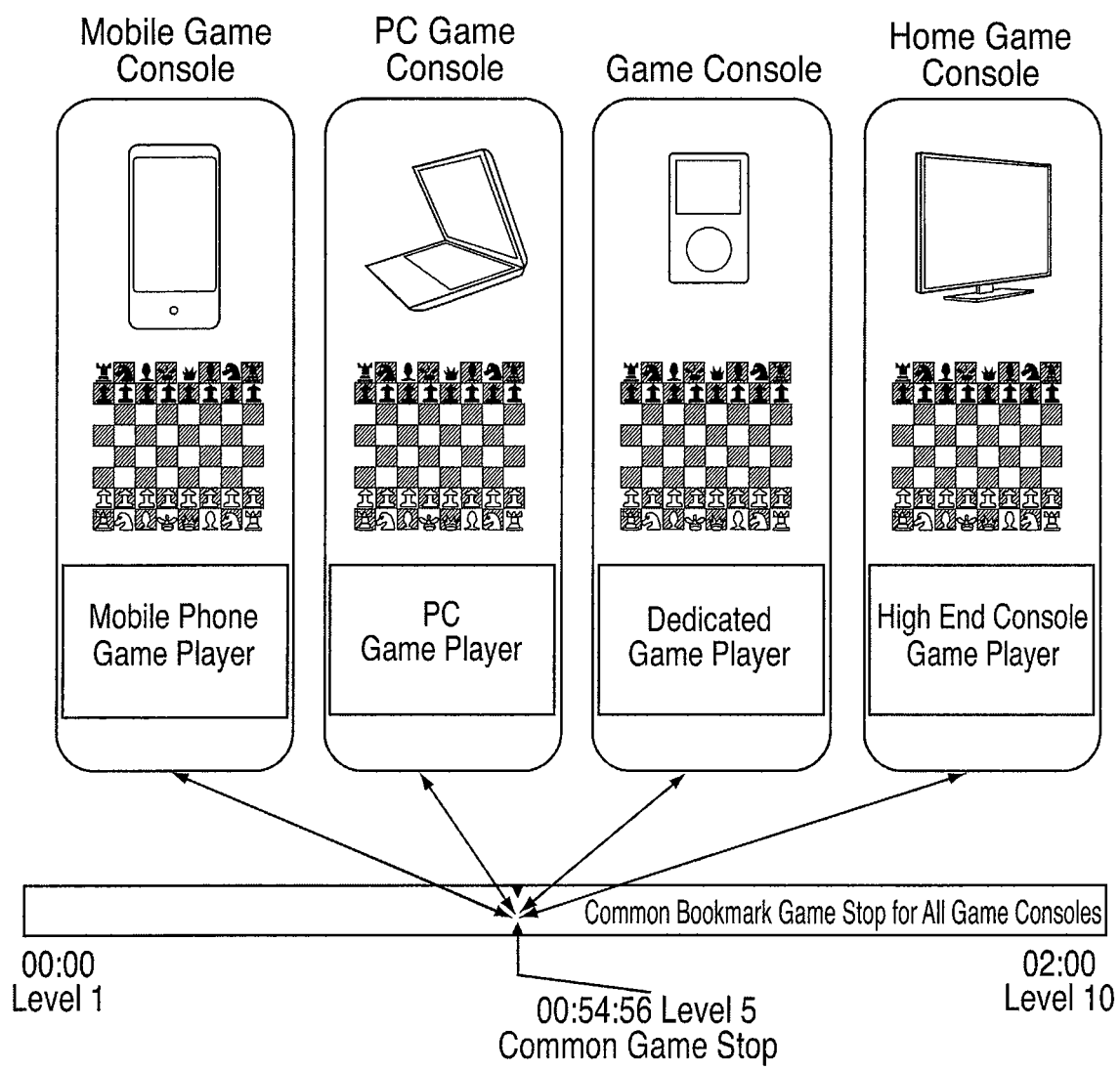
FIG. 4 is an illustration of how a resume function of an embodiment can be used across different game consoles.

FIG. 3 diagrammatically illustrates this process. As shown in FIG. 3, a common bookmark is used by all players (here, a mobile phone, a laptop PC, a personal player, and an HD TV). The storage device stores different quality versions of content (here, digitally optimized movies). When the storage device is used with one of these players, the appropriate quality content is sent to the player. The common bookmark is used to determine where to resume playback of the content, even if that particular instance of the content was not played before. While FIG. 3 used a digital movie as an example, it should be understood that other forms of content can be used. For example, in FIG. 4, the content takes the form of a game that can be played by various consoles (here, a mobile game console, a PC game console, a personal game console, and a home game console). Similar to the illustration in FIG. 3, in this illustration, a common bookmark is used to determine where in the game the "playback" of the game should resume.

A bookmark can take any suitable form. In one embodiment, the bookmark contains simple, straightforward progress markers that are relatively independent of content navigation. For example, simple units such as seconds or frames elapsed from the start of a movie can be used to compute the resume position in a new resolution. But with a very long movie or complex navigation from scene to scene, it can take host player B a long time to compute the resume location from such raw progress data. For instance, DVD and Blu-ray navigation involve complex playlists and multiple video streams. A player would need to "fast forward" to a time location and process a lot of data to reach a point near the end of a full-featured movie. Bookmarks can, therefore, exploit specific knowledge or conventions used within content navigation to speed up the resume process significantly. For example, a bookmark can store a relative progress marker instead of or in addition to an absolute progress marker. A relative marker would define progress from a known milestone in the content such as the start of a scene or the start of a level (for game content).

In these embodiments, a bookmark contains some type of progress marker for the content and, optionally, can contain environment data related to the state of playback and user selected options. A progress marker can be highly dependent on the content characteristics, and the claims should not be read to include a specific form of progress marker unless explicitly recited therein. One example of such characteristic for a movie is the number of seconds elapsed if the video were played at normal speed. Video progress can also be marked in many ways, including, but not limited to, time elapsed at normal speed from the start, total frames rendered from the start, number of a particular type of frame (e.g. I-Frames) or Groups of Pictures (GOPs) encountered, the total number of bytes decoded (expanded) in the movie so far, the total number of bytes read and decoded from the video file(s) so far, and time codes or other identification or synchronization markers embedded in the content (many video formats use a standard time marking format like SMPTE (VIT/Linear, etc.), Rewriteable Consumer Timecode (RCTC), or other variations of time codes), as well as any other information embedded in the media data itself, such as frame IDs, or searchable regular recurring patterns.

Besides the progress marker, the stored bookmark can include additional information or references that can be used to help map between resolutions. These include, for example, other characteristics of the last playback event, such as the resolution attributes (e.g., frame size, frame rate, and bit rate) and environmental data needed to restore the user experience on another player. For instance, most Blu-ray players allow picture in picture displays, the "unlocking" of extra scenes (e.g., Director's cuts), and video playback from multiple camera angles. Data related to if and how these features are enabled can be stored on the removable media in addition to the progress marker to compute and recreate the user experience in order to restore all the attributes of the playback from one player and resolution to the next.

DVD and Blu-ray movies have known chapter or scene markers, for example. So, one enhancement is to include progress markers that are relative to those scene milestones. When host player B attempts to restore the location from host player A's bookmark, it can skip over all the previous scenes and start the search from a known point. If the navigation is not compatible, then they can be made more compatible with the addition of new indices added outside the content files themselves. For example, QVGA movies are often single files, but an XML text file can be added that defines the file offset for each scene in a movie. The bookmark can reference the name of a tag in the XML file.

Further refinement is possible if simple tables of milestones and mapping files are not enough. For instance, scene selection in some systems is done dynamically using conditional scripting logic or Java applets. For instance, the added scenes in a Director's cut or the video that plays when multiple camera angles have been enabled may require scene selection through conditional logic. In these cases, the process to compute a resume location may need to involve invocation of logic which will take the environment variables stored in the Bookmark file and process it in a resolution-specific way to determine the best possible scene match. Another enhancement is to add more granular milestones to the navigation data. There may be invisible subscenes within a user-selectable "chapter" which do not show up in the end-user UI, but allow for faster resume. Data which helps scan faster, such as the ranges of time codes, can also be added to top level playlists to enable 100× or 1000× fast forwarding, for example.

Figure 5:
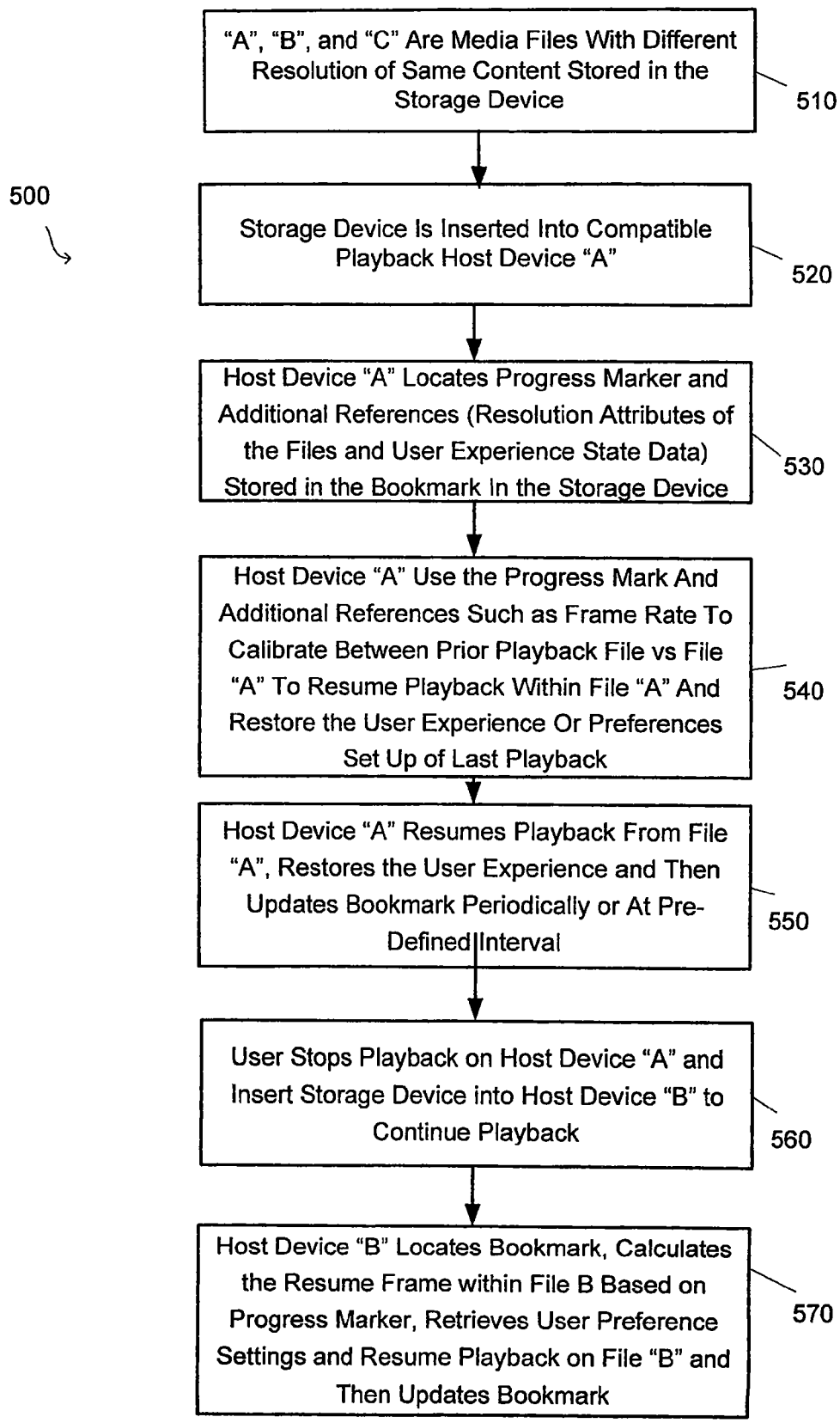
FIG. 5 is a flow chart of a method for resuming playback of content of an embodiment.

FIG. 5 is a flowchart 500 of another method of an embodiment where additional bookmark elements are used. As shown in the flowchart 500 in FIG. 5, content A, B, and C media files, which, here, are different resolution of the same content, are stored in the storage device 100 (act 510). The storage device 100 is then inserted into a compatible playback host device A (act 520). Host device A locates the progress marker and additional references (e.g., resolution attributes of the files and user experience state data) stored in the bookmark in the storage device 100 (act 530) and uses the progress mark and additional references (e.g., frame rate) to calibrate between a prior playback file and file A to resume playback within file A and restore the user experience or preferences set up of last playback (act 540). Host device A then resumes playback from file A, restores the user experience, and then updates the bookmark periodically or at a pre-defined interval or at a pre-defined instance (act 550). When the user stops playback on host device A and inserts the storage device 100 into host device B to continue playback (act 560), host device B locates the bookmark, calculates the resume frame within file B based on the progress marker, retrieves user preference settings, resumes playback on file B, and then updates the bookmark (act 570).

Many alternatives can be used with these embodiments. For example, as mentioned above, these embodiments can be extended to include non-video content such as games and music. In cases where the user experience is generated from a combination of static video (plays the same content every time) and dynamic content (some of the scenes are computed based on user interaction), the bookmark can be a composite of items such as, but not limited to, a video progress marker (static video), parameter values used by algorithms that generate the user experiences, and other parameters (e.g. level, current game score, etc.) that describe the user's inputs necessary to resume the experience. On resume, the content playback device can read the parameters from the resume file and re-construct the environment and restart the video at the comparable location.

In another alternative, these embodiments can be extended from media content to media programs. The code necessary to playback the media may vary from platform to platform. The binary code that executes to evaluate certain parameters may be different between platforms. For example, the playback systems can be from different manufacturers that have different hardware implementations. The resume function on Player B may access any combination of data and executables on the media to determine the resume location and recreate the environment.

These embodiments can also be extended from two players to a single player device when the single player is capable of playing the role of different Players A and B. (Accordingly, two "hosts" do not necessarily mean two different devices.) Some video media players have a built-in QVGA display and a TV out connection for connecting to a higher resolution display. These embodiments apply if the player selects between two resolutions of the content for playback. The current typical media player with multiple output options selects a single resolution and scales the rendered output dynamically to fit the output screen dimensions, and bookmarks stay with the player and are not stored on the removable media.

Figure 6:
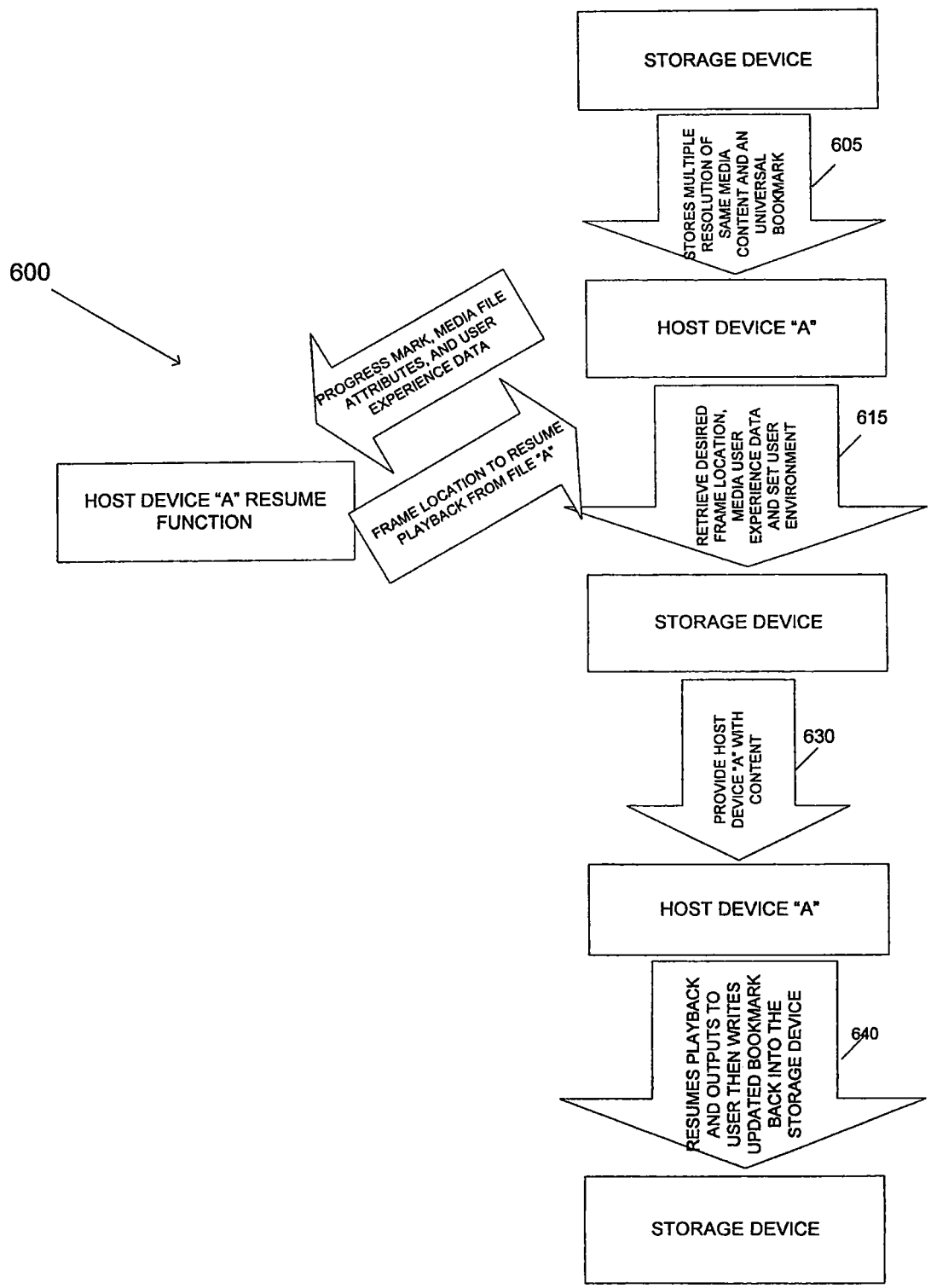
FIG. 6 is a flow chart of a method for resuming playback of content of an embodiment.

Finally, FIG. 6 is a flowchart 600 of a method for resuming playback of content stored on a storage device of an embodiment that takes into account some of the features discussed above. As shown in this flowchart 600, a storage device storing multiple resolutions of the same media content and a universal bookmark is placed in communication with a host device that supports resolution A (i.e., host device A) (act 605). The host device's resume function module receives the progress marker, media file attributes, and user experience data and, from that, calculates a frame location to resume playback from file A. Host device A then retrieves the desired frame location and media user experience data and sets the user environment (act 615). The storage device provides host device A with the content (act 630), and host device A resumes playback and then updates the bookmark back into the memory device (act 640).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A removable storage device comprising:
a memory operative to store a plurality of versions of content;
an interface configured to allow the removable storage device to removably connect with a plurality of different hosts, one host at a time; and
a controller in communication with the memory and the interface, wherein the controller is operative to:
receive a request for one of the versions of the content from one of the plurality of different hosts;
provide the requested version of the content to the one of the plurality of different hosts; and
provide bookmark information from which the one of the plurality of different hosts can determine a location where to resume playback of the content, wherein the bookmark information indicates where playback ended for a different version of the content when the different version of the content was played by a different one of the plurality of different hosts having a different platform;
wherein the removable storage device provides a single physical medium to make portable both the different versions of the content and the bookmark information across multiple hosts having different platforms.

2. The storage device of claim 1, wherein the different versions of the content comprise different resolutions.

3. The storage device of claim 2, wherein the different resolutions vary by one or more of the following: bit rate, frame rate, frame size, and encoding format.

4. The storage device of claim 1, wherein the different versions of the content are different graphical presentation versions of a same game.

5. The storage device of claim 1, wherein the bookmark information comprises a progress marker.

6. The storage device of claim 5, wherein the progress marker comprises one or more of the following: time elapsed, total frames rendered, a number of a particular type of frame encountered, a number of groups of pictures encountered, a total number of bytes read, a total number of bytes decoded, and an indication of an embedded identifier.

7. The storage device of claim 5, wherein the progress marker is independent of content navigation.

8. The storage device of claim 5, wherein the progress marker is relative to a marker predefined in the content.

9. The storage device of claim 1, wherein the bookmark information comprises data related to a state of playback.

10. The storage device of claim 1, wherein the bookmark information comprises information for restoring a user environment on another one of the plurality of different hosts.

11. The storage device of claim 1, wherein the bookmark information contains data from which the one of the plurality of different hosts can navigate to a resume location using conditional logic.

12. The storage device of claim 1, wherein the bookmark information further comprises data indicating at least one user-selected option.

13. The storage device of claim 1, wherein the information contains mapping data from which the one of the plurality of different hosts can map the bookmark information between different versions of the content.

14. A method for resuming playback of content, the method comprising:
performing the following in a removable storage device comprising a memory operative to store a plurality of versions of content and an interface configured to allow the removable storage device to removably connect with a plurality of different hosts, one host at a time:
receiving a request for one of the versions of the content from one of the plurality of different hosts;
providing the requested version of the content to the one of the plurality of different hosts; and
providing bookmark information from which the one of the plurality of different hosts can determine a location where to resume playback of the content, wherein the bookmark information indicates where playback ended for a different version of the content when the different version of the content was played by a different one of the plurality of different hosts having a different platform;
wherein the removable storage device provides a single physical medium to make portable both the different versions of the content and the bookmark information across multiple hosts having different platforms.

15. The method of claim 14, wherein the different versions of the content comprise different resolutions.

16. The method of claim 15, wherein the different resolutions vary by one or more of the following: bit rate, frame rate, frame size, and encoding format.

17. The method of claim 15, wherein the different versions of the content are different graphical presentation versions of a same game.

18. The method of claim 14, wherein the bookmark information comprises a progress marker.

19. The method of claim 18, wherein the progress marker comprises one or more of the following: time elapsed, total frames rendered, a number of a particular type of frame encountered, a number of groups of pictures encountered, a total number of bytes read, a total number of bytes decoded, and an indication of an embedded identifier.

20. The method of claim 18, wherein the progress marker is independent of content navigation.

21. The method of claim 18, wherein the progress marker is relative to a marker predefined in the content.

22. The method of claim 14, wherein the bookmark information comprises data related to a state of playback.

23. The method of claim 14, wherein the bookmark information comprises information for restoring a user environment on another one of the plurality of different hosts.

24. The method of claim 14, wherein the bookmark information contains data from which the one of the plurality of different hosts can navigate to a resume location using conditional logic.

25. The method of claim 14, wherein the bookmark information further comprises data indicating at least one user-selected option.

26. The method of claim 14, wherein the information contains mapping data from which the one of the plurality of different hosts can map the bookmark information between different versions of the content.

* * * * *